United States Patent
Votaw et al.

(10) Patent No.: US 10,269,016 B2
(45) Date of Patent: Apr. 23, 2019

(54) DUAL BIOMETRIC AUTOMATIC TELLER MACHINE ("ATM") SESSION INITIALIZATION HAVING SINGLE IN-LINE SESSION MAINTENANCE

(71) Applicant: Bank of America Corporation, Charlotte, NC (US)

(72) Inventors: Elizabeth Votaw, Potomac, MD (US); Xianhong Zhang, Seattle, WA (US); Wenhui Meng, Seattle, WA (US)

(73) Assignee: Bank of America Corporation, Charlotte, NC (US)

( * ) Notice: Subject to any disclaimer, the term of this patent is extended or adjusted under 35 U.S.C. 154(b) by 478 days.

(21) Appl. No.: 14/831,579

(22) Filed: Aug. 20, 2015

(65) Prior Publication Data

US 2017/0053284 A1 Feb. 23, 2017

(51) Int. Cl.
*G06Q 40/02* (2012.01)
*G06Q 20/40* (2012.01)
(Continued)

(52) U.S. Cl.
CPC ... *G06Q 20/40145* (2013.01); *G06Q 20/1085* (2013.01); *G06Q 20/3276* (2013.01); *G06Q 20/3278* (2013.01); *G06Q 20/4012* (2013.01)

(58) Field of Classification Search
CPC .......................... G06Q 20/1085; G06Q 40/02
(Continued)

(56) References Cited

U.S. PATENT DOCUMENTS 6,219,439 B1 4/2001 Burger
6,363,485 B1 3/2002 Adams et al.
(Continued)

OTHER PUBLICATIONS

"ATM uses biometrics, QR codes for secure cash withdrawals", dated Mar. 21, 2013, by: Jill Jaracz.*

*Primary Examiner* — Hai Tran
(74) *Attorney, Agent, or Firm* — Weiss & Arons LLP; Michael A. Springs, Esq.

(57) ABSTRACT

Systems and methods for authenticating a user's identity at an ATM are provided. One method may include capturing at least a portion of user's facial information using a facial recognition camera. The method may also include receiving information using an additional biometric scanner. The method may further include using one or more device handlers to receive information related to the captured portion of the user's facial information from the facial recognition camera and to receive information related to the additional biometric scanner. The one or more device handlers may also be used for determining one or more routing destinations for said information related to the captured portion of the user's facial information, for said information and for said information received from the additional biometric scanner. The method may also include transmitting the information received by the facial recognition camera and the information received from the additional biometric scanner for initially authorizing an ATM session, or information corresponding thereto, to said one or more routing destinations. The transmitting may further maintain the ATM session by continuing, following an initial authorization, for the duration of the ATM session, only authorization information corresponding to the information received by the facial recognition camera to the one or more routing destinations.

9 Claims, 12 Drawing Sheets

(51) Int. Cl.
*G06Q 20/10* (2012.01)
*G06Q 20/32* (2012.01)

(58) Field of Classification Search
USPC .......................................................... 705/43
See application file for complete search history.

(56) References Cited

U.S. PATENT DOCUMENTS

| | | | |
|---|---|---|---|
| 8,392,965 B2 | 3/2013 | Carter et al. | |
| 8,952,781 B2 | 2/2015 | Al-Azem et al. | |
| 2013/0124411 A1* | 5/2013 | Kobres | G06Q 40/02 |
| | | | 705/43 |
| 2013/0124855 A1* | 5/2013 | Varadarajan | G06Q 20/3276 |
| | | | 713/155 |
| 2013/0227651 A1* | 8/2013 | Schultz | G06F 21/32 |
| | | | 726/4 |
| 2013/0267204 A1* | 10/2013 | Schultz | H04W 12/06 |
| | | | 455/411 |
| 2015/0178732 A1* | 6/2015 | Laracey | G06Q 20/1085 |
| | | | 705/43 |

* cited by examiner

DUAL BIOMETRIC AUTOMATIC TELLER MACHINE ("ATM") SESSION INITIALIZATION HAVING SINGLE IN-LINE SESSION MAINTENANCE

FIELD OF TECHNOLOGY

Aspects of the invention relate to secure maintenance of an ATM session.

BACKGROUND

ATMs provide banking customers with the ability to withdraw funds, deposit funds and access bank account information. Because of their highly automated functions, ATMs are generally able to operate without the supervision of a human clerk. As a result, many ATMs are located in a variety of locations remote from banking centers. For example, ATMs may be placed on street corners, at convenience stores, supermarkets or sports arenas. This wide variety of ATM locations provides banking customers with quick access to cash and bank account information in multiple locations.

However, the lack of human supervision at the multiple ATM locations creates the risk of the security of one or more of the ATMs being compromised.

Customer behavior at an ATM may also create opportunities for persons with malicious intents. For example, when a customer is in the middle of a session at an ATM, the customer may become distracted. Further, the customer may abandon the ATM session prior to termination of the session. Such abandonment may occur while the customer is still authorized to perform additional functions on the ATM. A person with malicious intent who is standing nearby may, in the absence of the customer who initiated and validated the ATM session, take over the ATM session and perform actions on the customer's account such as, for example, removing money from the customer's account, transferring funds to a third party account, paying bills from the customer's account, etc.

While ATM's typically cancel authorization after a certain time period, this safety mechanism may be insufficient to prevent some theft. Therefore, it is desirable to provide systems and methods to reduce the danger to a customer from the customer's own inattentive behavior at the ATM. Specifically, it is desirable to provide at an ATM continuous security during the maintenance of an ATM session.

SUMMARY OF THE DISCLOSURE

It is an object of this invention to provide systems and methods for continuously authenticating the identity of a user at an ATM. One system may preferably include a facial recognition camera being configured to capture at least a portion of user's facial information. The system may also include an additional biometric identifier. The system may also include one or more device handlers for receiving information related to the captured portion of the user's facial information from the facial recognition camera, for receiving additional biometric identification information from the additional biometric identifier and for determining one or more routing destinations for the information related to the captured portion of the user's facial information and for the additional biometric identification information. The system may also include a transmitter. The transmitter may be configured to transmit the information received by the facial recognition camera and the information received by the additional biometric identification in order to initially authorize the ATM session. The transmissions may be routed to one or more routing destinations.

The transmitter may be further configured to maintain the ATM session by continuing to transmit, following the initial authorization and continuing for the duration of the ATM session, only authorization information received by the facial recognition camera to said one or more routing destinations.

BRIEF DESCRIPTION OF THE DRAWINGS

The objects and advantages of the current invention will be apparent upon consideration of the following detailed description, taken in conjunction with the accompanying drawings, in which like reference characters refer to like parts throughout, and in which.

DETAILED DESCRIPTION OF THE DISCLOSURE

Figure 1A:
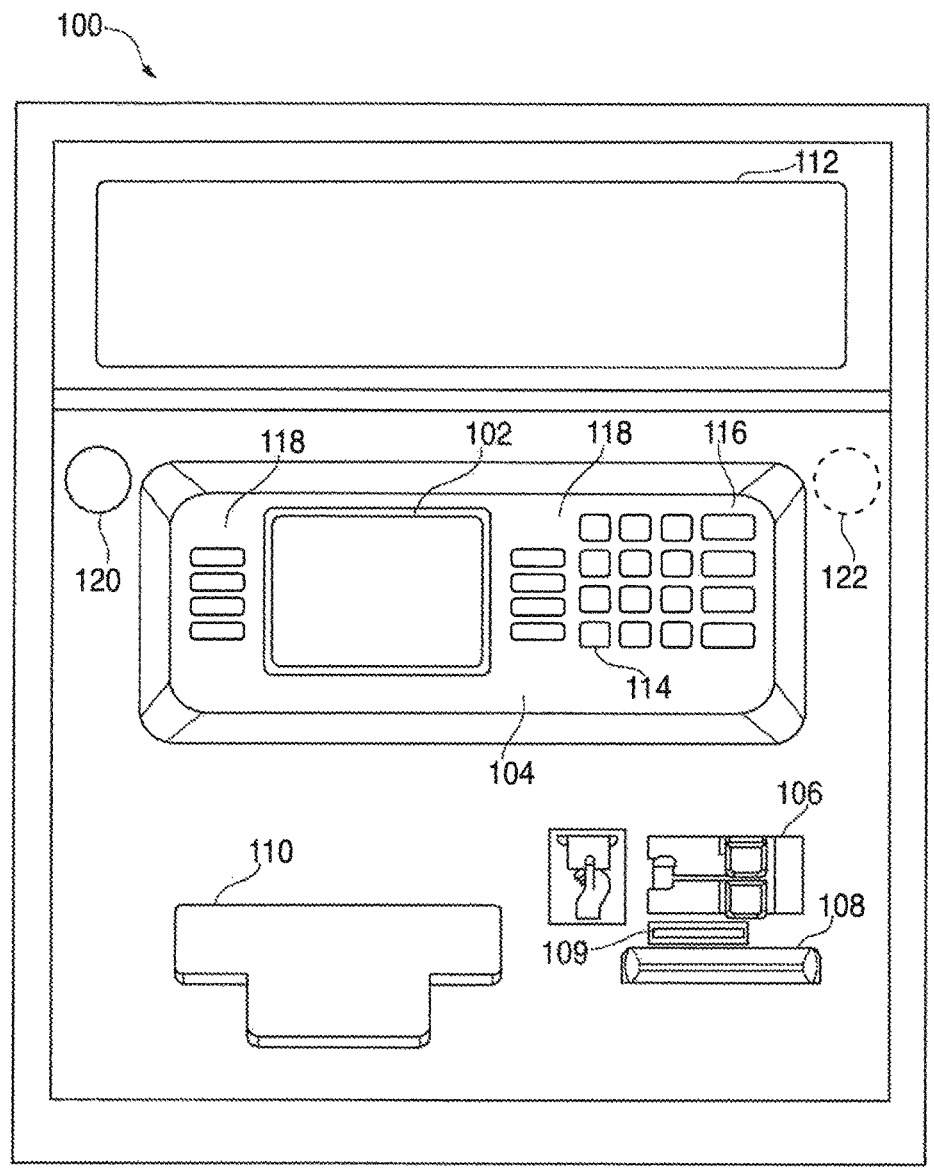
FIG. 1A shows an apparatus for use according to the principles of the invention.

An Automated Teller Machine ("ATM") for authenticating an identity of a user for the duration of an ATM session is provided. The ATM may include a facial recognition camera being configured to capture at least a portion of user's facial information. The ATM may also include a QR code receiving device for detecting and reading a QR code displayed on a mobile device. The facial recognition camera may be the same as, or different from, the QR code receiving device. It should be noted that the mobile device should preferably be known to the ATM and/or the system associated with the ATM, secure and preferably registered such that the facial recognition should be associated in some way with the owner of the ATM.

In addition, the ATM may include one or more device handlers for receiving information related to the captured portion of the user's facial information from the facial recognition camera and for receiving information related to the QR code from the QR code receiving device. The one or more device handlers may also, in certain embodiments, determine one or more routing destinations for the information related to the captured portion of the user's facial information and for the information related to the QR code. The ATM may also include a transmitter. The transmitter may be in electronic communication with the one or more device handlers. The transmitter may be configured to transmit the information received by the facial recognition camera and the QR code receiving device. The transmission may, in certain embodiments, be used for initially authorizing an ATM session. Such transmitting may be routed to the one or more routing destinations.

In some embodiments, the transmitter may be further configured to maintain the ATM session by continuing to transmit, following an initial authorization and continuing for the duration of the ATM session, only authorization information received by the facial recognition camera to the one or more routing destinations.

In certain embodiments, the QR code receiving device may include a laser light source. In certain embodiments, the QR code receiving device may also include a laser light acceptor.

Some embodiments of the ATM may include a selectively releasable slot for providing a light communication pathway between the QR code receiving device and a mobile device located at a distance from the ATM. Certain embodiments may also include a rotatable mirror for directing light from the ATM to a mobile device, and/or for receiving light from a mobile device.

In a first operational state, the rotatable mirror may be configured for directing light to a flatbed scanner portion of a document deposit device and for receiving light from the flatbed scanner portion of the document deposit device. In a second operational state, the rotatable mirror may be configured for directing light to a mobile device located at a distance from the ATM and for receiving light from the mobile device. In certain embodiments of the first operational state and/or the second operational state, the rotatable mirror may be configured to pan light, through the slot, over a field such as a two-dimensional field associated with a QR-code. In some embodiments of the first operational state and/or the second operational state, light may be generated by a plurality of light sources instead of a single light source.

The transmitter may be configured to maintain the ATM session by continuing to periodically transmit, following an initial authorization and continuing for the duration of the ATM session, only authorization information received by the facial recognition camera to the one or more routing destinations. In certain embodiments, the transmitter may further be configured to maintain the ATM session by continuing to continuously transmit, following an initial authorization and continuing for the duration of the ATM session only authorization information received by the facial recognition camera to the one or more routing destinations.

Certain embodiments may include a method for authenticating a user's identity at an Automated Teller Machine ("ATM") over a period of time. The methods may include capturing at least a portion of user's facial information using a facial recognition camera, displaying a QR code for capture by a mobile device and receiving information using a wireless receiver from the mobile device that corresponds to the QR code. Such information received by the wireless receiver may include information that indicates an identification number associated with the mobile device, an identity of a person associated with the mobile device, an indication that the mobile device has received and/or processed the QR code and/or any other suitable information generated by the mobile device in response to the scan of the QR code. The wireless receiver at the ATM may be, for example, a Bluetooth frequency receiver, a near field communication ("NFC") receiver and/or a QR code receiver.

The method may also include using one or more device handlers to receive information related to the captured portion of the user's facial information from the facial recognition camera and to receive information related to the QR code from the wireless receiver. The one or more device handlers may also determine one or more routing destinations for the information related to the captured portion of the user's facial information and for the information that corresponds to the QR code. The one or more device handlers may also be used for transmitting the information received by the facial recognition camera and the wireless receiver for initially authorizing an ATM session. The transmitting may be routed to one or more routing destinations. The transmitting may further maintain the ATM session by continuing to transmit, following an initial authorization, for the duration of the ATM session, only authorization information corresponding to the information received by the facial recognition camera to the one or more routing destinations. An example of an appropriate routing destination for the facial recognition information may be a central server electronically coupled to the ATM.

It should be noted that, for all the embodiments described herein, an additional biometric identifier may be added to the ATM either in addition to the QR code receiver or instead of the QR code receiver. It should be noted as well that the additional biometric identifier may be captured by a capture device mounted on the ATM. It should also be noted as well that the additional biometric identifier may be captured by a capture device integral to the mobile device.

Yet another embodiment may relate to an Automated Teller Machine ("ATM") for authenticating an identity of a user for the duration of an ATM session. The ATM may include a facial recognition camera being configured to capture at least a portion of user's facial information, a QR code displaying device for displaying a QR code for capture on a mobile device, a receiver for receiving information corresponding to a responsive information generated by the mobile device in response to the QR code capture at the mobile device and a transmitter. The transmitter may receive information corresponding to the captured portion of the user' facial information and be configured to transmit the information received by the facial recognition camera and the QR code receiving device for initially authorizing an ATM session to one or more routing destinations. The transmitter may be further configured to maintain the ATM session by continuing to transmit, following an initial authorization and continuing for the duration of the ATM session, only authorization information received by the facial recognition camera to the one or more routing destinations.

It should be noted that, for all the embodiments described herein, the ATM may be coupled, via its receiver or additional hardware, to a central ATM server. The central ATM server may be remote from the ATM.

Systems and methods for providing a more secure Automated Teller Machine ("ATM" transaction are provided. The systems and methods of the invention may increase the difficulty of taking advantage of a user's inattentive behavior, or other mishap, that may take place during a user's authorized ATM session.

As will be appreciated by one skilled in the art, although systems and methods of maintaining an ATM session at an ATM have been illustrated, systems and methods according to the invention may be applicable to other areas and other devices. For example, systems and methods according to the invention may be applied to any apparatus that requires the maintenance of a user's interactive session. For example, some embodiments of the invention may be applied to kiosks, pre-paid phone booths or any other suitable electronic device configured to maintain authentication of the identity of a user.

Certain embodiments of the invention may also be implemented on one or more mobile devices. Exemplary mobile devices include mobile phones, personal computers, touch screen telephones, iPads™, iPhones™, Android Phones™, tablets, laptops and/or any other suitable electronic device. Exemplary usages of the invention with one or more of the aforementioned mobile devices include a user using a PIN and biometric identification in any method described herein to provide access to the mobile device itself, to access an application included on the device and/or to access secured internet websites and/or to validate his identity to purchase items on the internet.

Additionally, the systems and methods of the invention may be included in an application configured to be downloaded on a mobile device. In some embodiments, the application may be purchased prior to download. It should be noted that the application may be suitable to be downloaded to an Apple™ mobile device, Android™ mobile device or any other suitable device.

Illustrative embodiments of apparatus and methods in accordance with the principles of the invention will now be described with reference to the accompanying drawings, which form a part hereof. It is to be understood that other embodiments may be utilized and that structural, functional and procedural modifications may be made without departing from the scope and spirit of the present invention.

As will be appreciated by one of skill in the art, the invention described herein may be embodied in whole or in part as a method, a data processing system, or a computer program product. Accordingly, the invention described herein may take the form of an entirely hardware embodiment, an entirely software embodiment or an embodiment combining software, hardware and any other suitable approach or apparatus.

Furthermore, aspects of the invention may take the form of a computer program product stored by one or more computer-readable storage media having computer-readable program code, or instructions, embodied in or on the storage media. Any suitable computer readable storage media may be utilized, including hard disks, CD-ROMs, optical storage devices, magnetic storage devices, and/or any combination thereof. In addition, various signals representing data or events as described herein may be transferred between a source and a destination in the form of electromagnetic waves traveling through signal-conducting media such as metal wires, optical fibers, and/or wireless transmission media (e.g., air and/or space).

FIG. 1 shows illustrative self-service device 100, which may be an ATM. Self-service device 100 may include monitor 102, keypad 104, card reader port 106, document acceptor 108, quick response ("QR") scanning slot 109, item dispenser 110 and security screen 112.

Monitor 102 may exchange visual and or audio information with a customer. Keypad 104 may include alphanumeric keys 114 for the customer to enter numerical and textual data. Keypad 104 may include control keys 116. In some embodiments, control keys 116 may be used to communicate control information, such as instructions, to self-service device 100. Keypad 104 may include soft keys 118. Soft keys 118 may have functions that are dictated by programming and are presented to the customer using information that may be displayed on monitor 102.

Card reader port 106 may be the front end of any suitable card reader. The card reader may read magnetically encoded information on transaction instruments such as bank cards. In some embodiments, self-service device 100 may include a contactless chip reader, a wireless transceiver or any other suitable interface for exchanging transaction information with a transaction instrument. The transaction instrument may be a chip, an RFID tag, a smart card, a PDA, a telephone or any other suitable device.

Document acceptor 108 may accept any suitable documents. For example, document acceptor 108 may accept envelopes, deposit forms, bills, checks or any other suitable documents. In some embodiments, document acceptor 108 may feed into a scanner that digitizes the documents for image-based transaction processing. Item dispenser 110 may dispense items. For example, item dispenser 110 may dispense bills. Security screen 112 may visually screen a surveillance device (not shown). The surveillance device may provide video information regarding individuals that are present near the self-service device and regarding the conditions thereabout.

In some embodiments, self-service device 100 may include a biometric sensor. The biometric sensor may identify a customer based on a feature, such as an anatomical feature, of the customer. For example, the biometric sensor may be configured to identify the customer based on all or part of a face, a fingerprint, an iris, a retina, a hand or any other suitable anatomical feature. The biometric sensor may identify the customer based on a behavioral feature such as a signature, a voice, a gait or any other suitable behavioral feature. In some of these embodiments, information received by the biometric sensor may be used, in conjunction with PIN input and user fingerprint information, to validate the identity of the user.

For example, the biometric sensor may include an iris scanner. In some of these embodiments, a camera built into an ATM, as shown at 120 and optionally at 122, may be used as an iris scanner and authentication may require an input PIN and an iris scan.

Figure 1B:
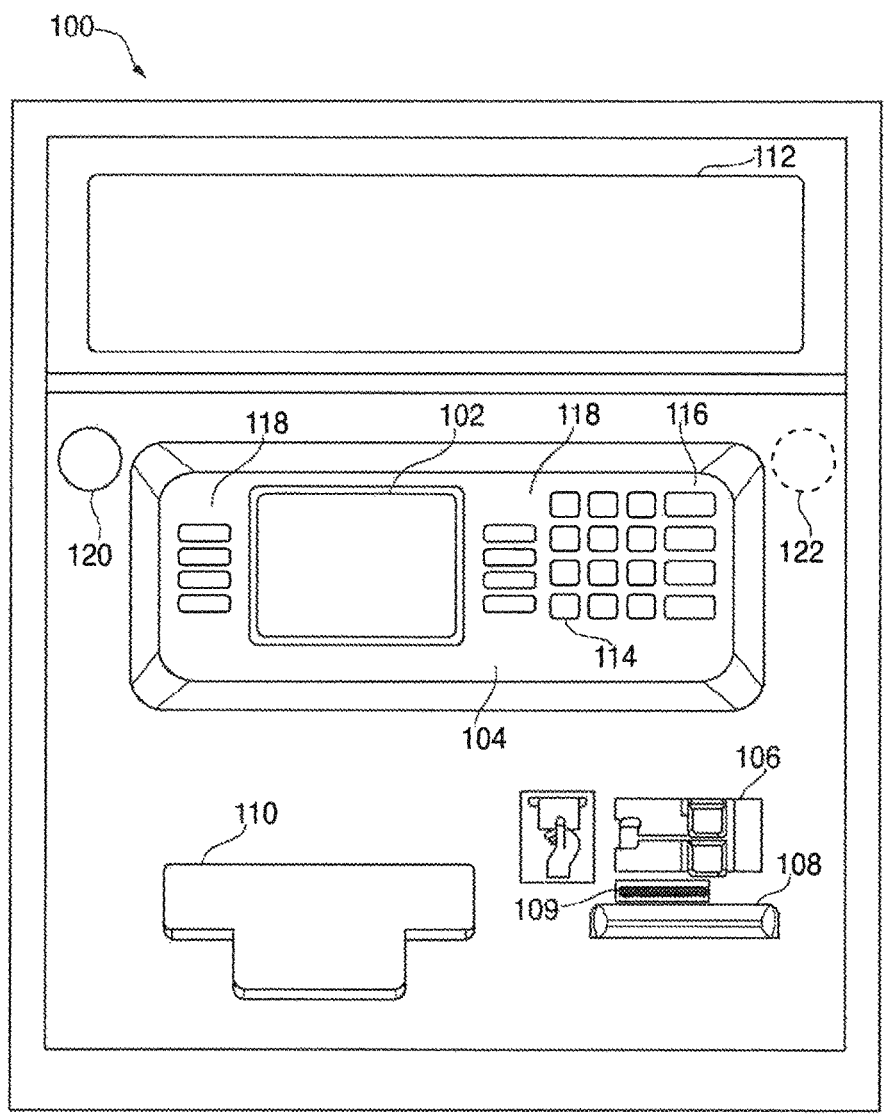
FIG. 1B shows the apparatus of FIG. 1A with additional detail relating to an open slot in the face of the ATM.

FIG. 1A shows slot 109 in an open confirmation (typically for use, when open, with document acceptor 108 and light source associated therewith and for projecting through slot 109) which may be temporarily utilized as a scanner of a QR code displayed on a mobile device. When slot 109 is open, as shown in FIG. 1B, an internal scanner associated therewith may preferably be used.

Figure 2A:
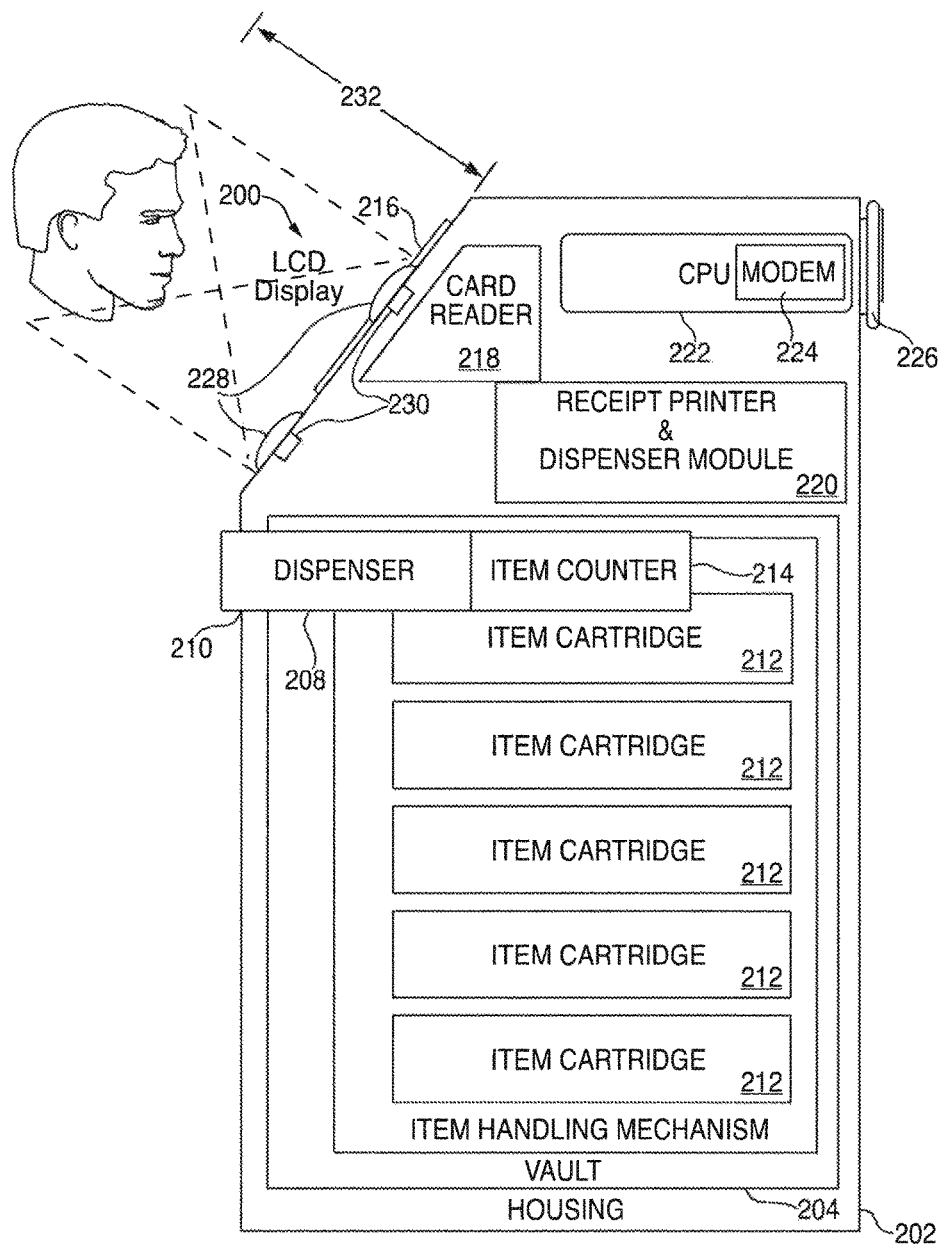
FIG. 2A shows a schematic diagram of another apparatus for use according to the principles of the invention.

FIG. 2A shows illustrative self-service device 200. Self-service device 200 may have one or more of the features of self-service device 100 (shown in FIGS. 1A and 1B). Self-service device 200 may include housing 202. Self-service device 200 may include vault 204. Vault 204 may include items (not shown). Item handling mechanism 206 may be present in vault 204. Item handling mechanism 206 may store, arrange, dispense and/or otherwise handle items for dispensing from self-service device 200. For example, item handling mechanism 206 may include conveyors (not shown) for positioning and repositioning items for dispensing by dispenser 208 through item port 210. Items (not shown) in item handling mechanism 206 may be contained in item cartridges 212. For example, when the items are bills, item cartridges 212 may be cash cartridges.

Item handling mechanism 206 may include item counter 214. Item counter 214 may count items prior to items being dispensed by dispenser 208.

Self-service device 200 may include LCD display 216 and a keypad (not shown) for customer interaction. The keypad may be a keypad including display screens and one or more fingerprint scanners or other biometric recording devices, which may be used in accordance with the systems and methods of the invention.

Card reader 218 may be present for receiving transaction information from the customer via a suitable transaction instrument. Self-service device 200 may include receipt printer and dispenser module 220. Receipt printer and dispenser module 220 may provide the customer with a record of a transaction. CPU 222 may control a customer input/output module ("I/O"), receipt of input PIN and biometric information, dispensing processes, which may include initialization, actuation, dispensing and any other suitable processes, receipt printing and dispensing, transaction channel communications and any other suitable processes. The transaction channel communications may be performed using modem 224, which may be any suitable communication device. Modem 224 may communicate with a local or regional network router (not shown) which may route information to a third party. Service monitor 226 may be provided for a service technician to exchange information and instructions with CPU 222.

Video Camera lenses 228 and modules 230 may optionally be included in self-service device 200. Lenses 228 and modules 230 may receive biometric information from a user and transmit the information to CPU 222.

Video camera lenses 228 and module(s) 230 may preferably be used to fix coordinates of an ATM customer's face (or head) during an ATM session. In addition, video camera lenses 228 and module(s) 230 may be used, either alone or in tandem, to determine a distance 232 from the ATM to the person's face (or head). One or more video camera lenses 228 and module(s) 230 may be used, either alone or in tandem, to determine, either in a horizontal orientation and/or in a vertical orientation, the location of the user's face (or head) with respect to the ATM.

Once distance 232 is established, the ATM may alternatively, require that, for the session to continue (or be maintained) as an authorized session, the user's face (or head) may preferably remain no more than a threshold distance from the ATM and/or no less than a second threshold distance from the ATM.

In some embodiments, the ATM may require that, for the session to continue, or be maintained, the user's face (or head) may preferably remain at some vertical height with respect to the ATM and/or at some horizontal location with respect to the ATM. Accordingly, if the user's face or head, moves greater than a threshold amount from the ATM either in a vertical direction, or a horizontal direction, or both together, then the ATM may terminate the session. Alternatively, the ATM may allow the session to continue but may require additional security measures to authorize any transactions on the account.

In some embodiments, the ATM may suspend transactional privileges during the ATM session pending return of the user's face (or head) to within a predetermined threshold distance and/or orientation established at initialization of the session.

In certain embodiments, the ATM may only reconfer transactional privileges during the ATM session following the return of the user face (or head) to within a predetermined threshold distance of the vertical position of the face (or head) as determined during initialization of the ATM session and following the user input of a pre-determined code. The code may correspond to the user's regular pin or the code may be a different pin number that is created specifically to authorize a return to an earlier-initiated, then truncated—i.e., a session which did not formally terminate and the customer may have just wandered away from the ATM, session.

The user input of the pre-determined code may be triggered by a prompt displayed on the ATM following the return of the user's face (or head) to within the predetermined threshold distance of the vertical position of the face (or head) as determined during initialization of the ATM session.

In some embodiments, the ATM may suspend transactional privileges, or other specific privileges, during the ATM session pending return of the user's face (or head) to within a predetermined threshold distance of the horizontal position of the face (or head) as determined during initialization of the ATM session. In certain embodiments, the ATM may only reconfer transactional privileges during the ATM session following the return of the user face (or head) to within a predetermined threshold distance of the horizontal position of the face (or head) as determined during initialization of the ATM session and following the user input of a pre-determined code.

In some embodiments, the ATM may suspend transactional privilege during the ATM session pending return of the user's face (or head) to within a predetermined threshold distance of the vertical position of the face (or head) as determined during initialization of the ATM session. In certain embodiments, the ATM may only reconfer transactional privileges during the ATM session following the return of the user face (or head) to within a predetermined threshold distance of the vertical position of the face (or head) as determined during initialization of the ATM session and following the user input of a pre-determined code.

Figure 2B:
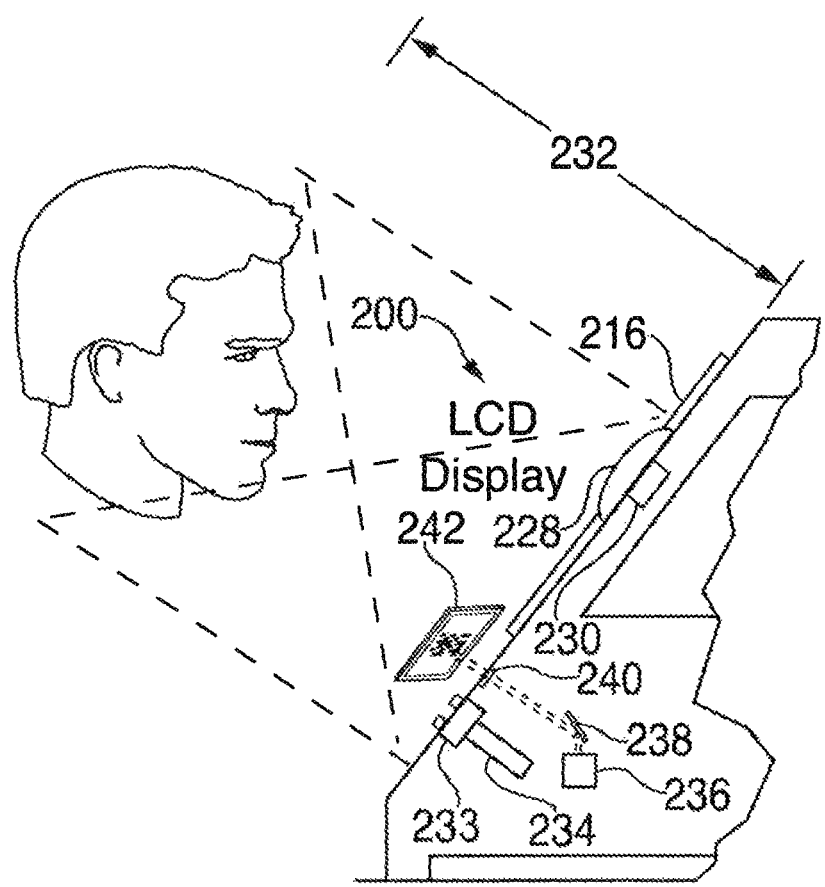
FIG. 2B shows a blown-up portion of the apparatus shown in FIG. 2A with additional hardware, according to certain embodiments.

FIG. 2B shows a schematic diagram of an embodiment including additional hardware within the ATM. Specifically, FIG. 2B shows check deposit acceptor 233, scanner flatbed 234, scanner light source (which may use known laser light technology) and/or light acceptor 236 (which may use known light accepting technology) (hereinafter referred to collectively as "source/acceptor"), rotatable mirror 238 and slot 240.

In certain embodiments, the hardware shown in FIGS. 2B (and 2C) may be used in at least two different states. In the event that a user selects to initialize an ATM session using a QR code located either on a user's mobile device 242, source/acceptor 236 may preferably be used, in conjunction with rotatable mirror 238 as follows. Light may be directed from source/acceptor 236 to rotatable mirror 238.

In this state, slot 240 is preferably open. Rotatable mirror 238 may then reflect the light out of slot 240 to capture the QR code on device 242.

Reflected light, or any other suitable light-based communication, may then be received by source/acceptor 236 which may then be used to identify, and, as necessary, further process the QR code.

Figure 2C:
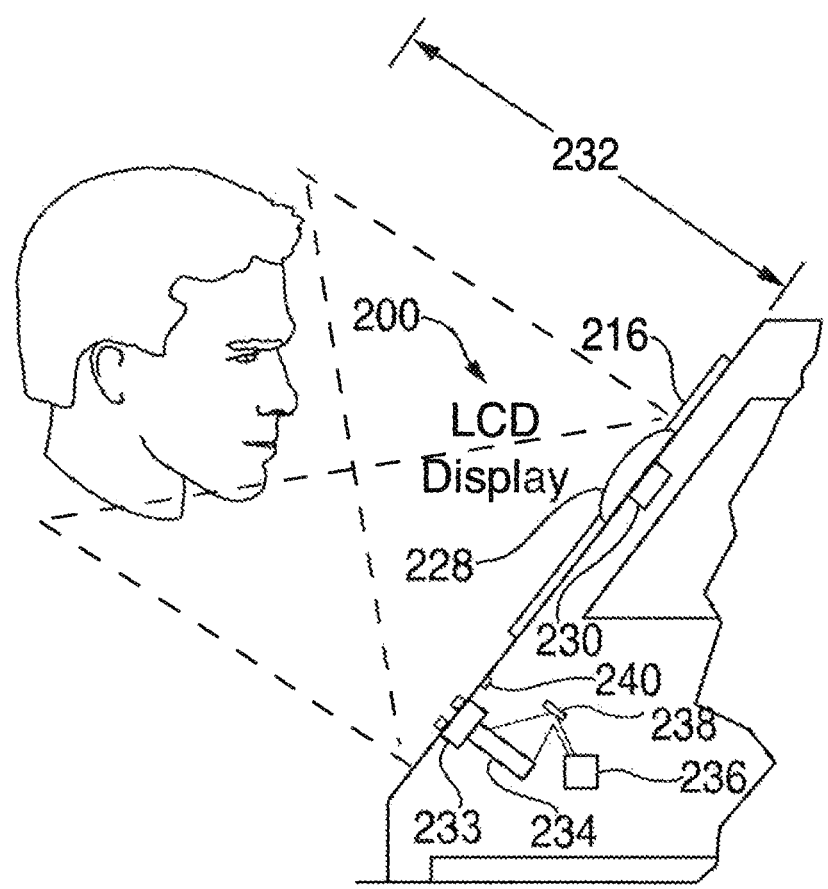
FIG. 2C shows the apparatus of FIG. 2B in a second operational state.

In at least a second state, ATM may be able to use deposit acceptor 233 to accept check or cash deposits or other documents. In this state, slot 240 may preferably be closed. In certain circumstances, slot 240 may not appear to be a slot at all. When the ATM is being used to accept deposits, source/acceptor 236 is preferably in light communication via rotatable mirror 238 with scanner flatbed 234. Such communication may preferably pull the image from a deposited item and transmit the image for further processing. Rotatable mirror 238 may preferably be disposed in a second orientation such that deposit/acceptor 236 may preferably be configured to receive information from scanner flatbed 234. This is shown in FIG. 2C by the different angle of the light reflected from the mirror.

Figure 3:
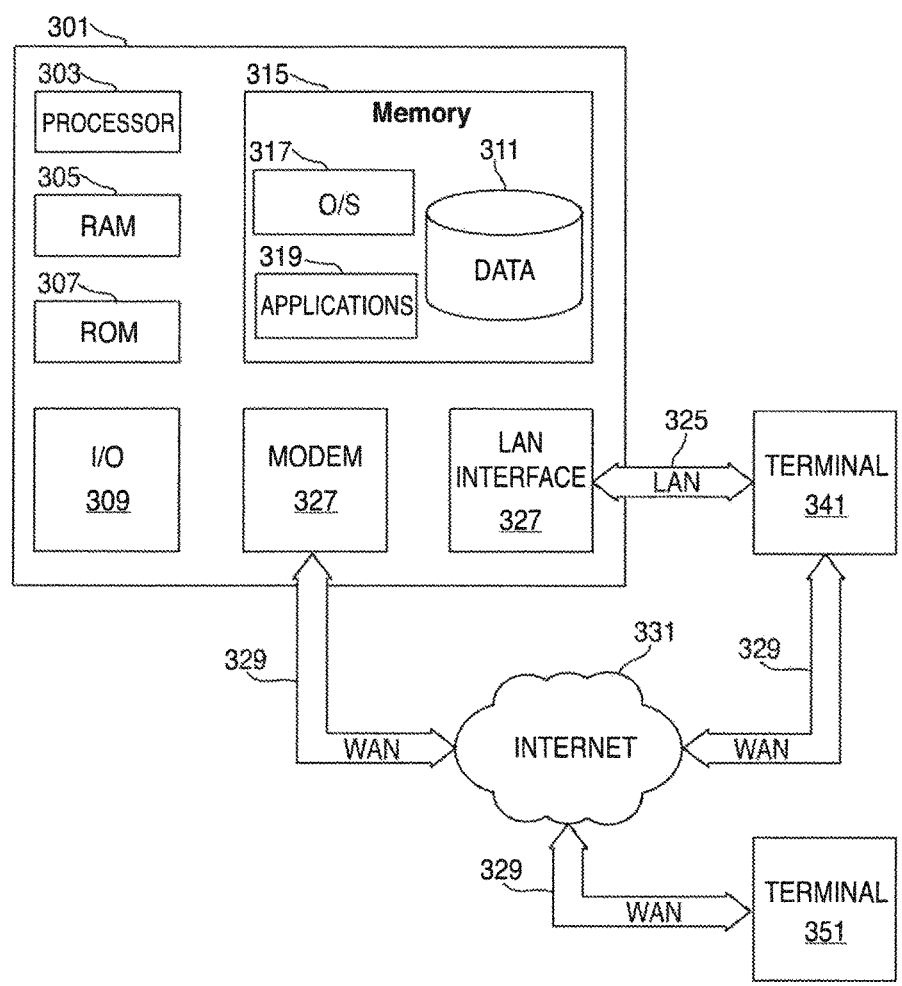
FIG. 3 shows apparatus that may be used in accordance with the principles of the invention.

FIG. 3 is a block diagram that illustrates a computing device 301 (alternatively referred to herein as a "server" or "computer") that may be used according to an illustrative embodiment of the invention. It should be noted that computing device 301 may illustrate apparatus included in ATM CPU 222 (shown below in FIG. 4), the ATM server (such as the ATM self-service device management module 506 shown in FIG. 5), and a PIN processor resident therein and/or other suitable system component.

The computer server 301 may have a processor 303 for controlling overall operation of the server and its associated components, including RAM 305, ROM 307, I/O module 309, and memory 315.

I/O module 309 may include a microphone, keypad, touch screen, and/or stylus through which a user of server 301 may provide input, and may also include one or more of a speaker for providing audio output and a video display device for providing textual, audiovisual and/or graphical output. Software may be stored within memory 315 and/or computer storage to provide instructions to processor 303 for enabling server 301 to perform various functions. For example, memory 315 may store software used by server 301, such as an operating system 317, application programs 319, and an associated database 311. Alternatively, some or all of server 301 computer executable instructions may be embodied in hardware or firmware (not shown).

Server 301 may operate in a networked environment supporting connections to one or more remote computers, such as terminals 341 and 351. Terminals 341 and 351 may be ATMs, personal computers or servers that include many or all of the elements described above relative to server 301. The network connections depicted in FIG. 3 include a local area network ("LAN") 325 and a wide area network (WAN) 329, but may also include other networks (not shown). When used in a LAN networking environment, computer 301 is connected to LAN 325 through a network interface or adapter 313. When used in a WAN networking environment, server 301 may include a modem 327 or other means for establishing communications over WAN 329, such as Internet 331. It will be appreciated that the network connections shown are illustrative and other means of establishing a communications link between the computers may be used. The existence of any of various well-known protocols such as TCP/IP, Ethernet, FTP, HTTP and the like is presumed, and the system can be operated in a client-server configuration to permit a user to retrieve web pages from a web-based server. Any of various conventional web browsers can be used to display and manipulate data on web pages.

Additionally, application programs 319, which may be used by server 301, may include computer executable instructions for invoking user functionality related to communication, such as PIN processing, QR code processing, key formation, key encryption, key transmission, email, short message service (SMS), and voice input and speech recognition applications.

Computing device 301 and/or terminals 341 or 351 may also be mobile terminals including various other components, such as a battery, speaker, and antennas (not shown). Terminal 351 and/or terminal 341 may be portable devices such as a laptop, cell phone, iPhone manufactured by Apple Corporation of Cupertino, Calif., Blackberry™, or any other suitable device for storing, transmitting and/or transporting relevant information.

Any suitable information may be stored in memory 315.

One or more of applications 319 may include one or more algorithms that may be used to control remote ATM operations and/or any other suitable tasks related to end-to-end self-service device operation.

It should be noted that the invention may be operational with numerous other general purpose or special purpose computing system environments or configurations. Examples of known computing systems, environments, and/or configurations that may be suitable for use with the invention include, but are not limited to, personal computers, server computers, hand-held or laptop devices, mobile phones and/or other personal digital assistants ("PDAs"), multiprocessor systems, microprocessor-based systems, set top boxes, programmable consumer electronics, network PCs, minicomputers, mainframe computers, distributed computing environments that include any of the above systems or devices, and the like.

It should additionally be noted that the invention may be described in the general context of computer-executable instructions, such as program modules, being executed by a computer. Generally, program modules include routines, programs, objects, components, data structures, and the like, that perform particular tasks or implement particular abstract data types. The invention may also be practiced in distributed computing environments where tasks are performed by remote processing devices, such as remote ATMs, that are linked through a communications network for transmitting PIN information, QR code information and key information formulated in response to QR code information transmission as well as any other suitable communication. In a distributed computing environment, program modules may be located in both local and remote computer storage media including memory storage devices.

Figure 4:
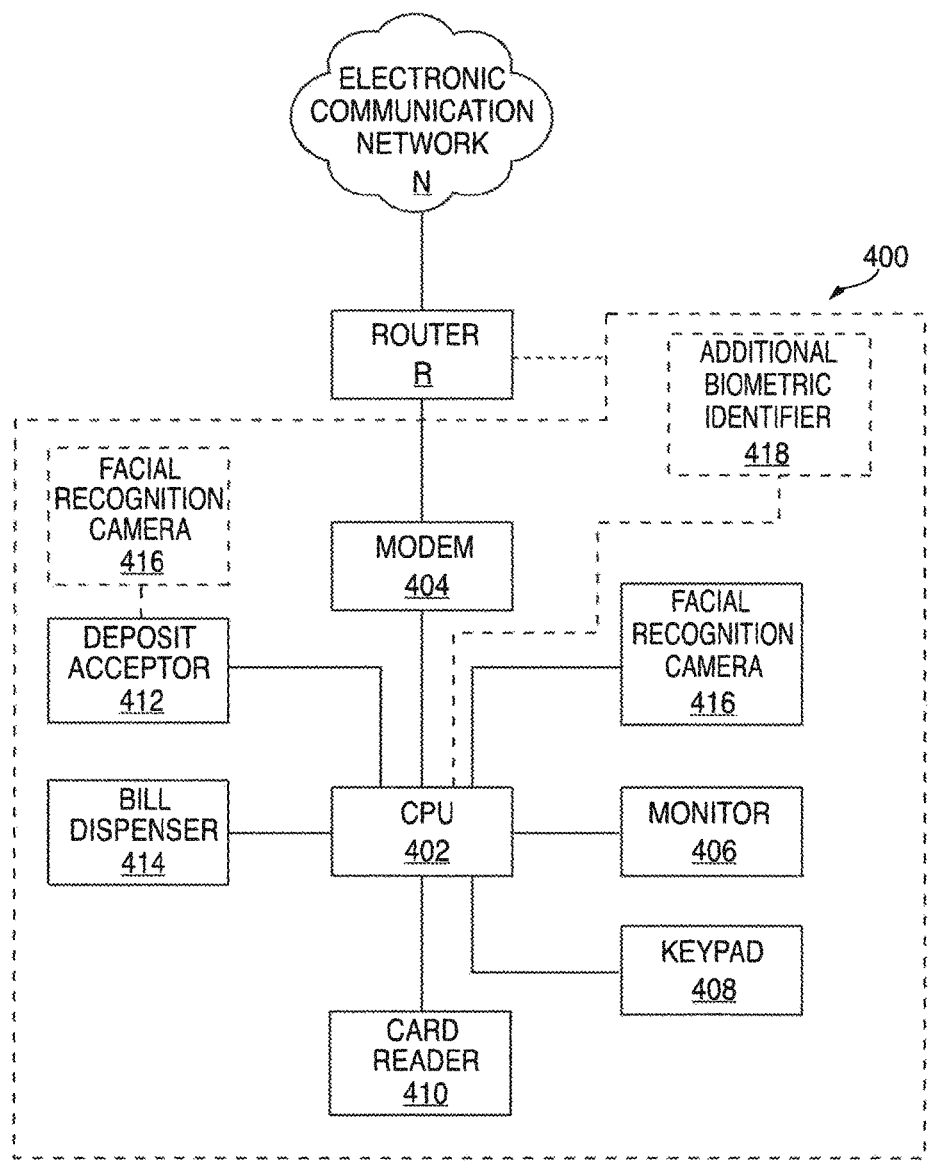
FIG. 4 shows a schematic diagram of hardware apparatus for use according to the principles of the invention.

FIG. 4 shows control system 400 for controlling a self-service device such as 100 or 200 (shown, respectively, in FIGS. 1 and 2). System 400 may be controlled by CPU 402. CPU 402 may be a computing device such as computing device 301 (shown in FIG. 3). CPU 402 may receive information from a customer via monitor 406, keypad 408, card reader 410 and deposit acceptor 412. CPU 402 may exchange the information with electronic communication network N via modem 404, which is in communication with router R. CPU 402 may dispense bills through bill dispenser 414.

FIG. 4 may include one or more facial recognition camera(s) 416. Facial recognition camera(s) 416 may be in electronic communication with CPU 402. CPU 418 may be in electronic communication with Modem 404 and/or Modem 420. Modem 420 may be in electronic communication with Router R. It should be noted that, in the embodiments utilizing a plurality of facial recognition cameras, the retrieved facial image may preferably be retrieved as a depth-based image which corresponds to the depth information retrieved by comparing and contrasting the images from the plurality of facial recognition cameras 416. It should be noted that the cameras may be positioned at different distances from the exterior of the ATM to capture different depths.

CPU 402 may be removably connected to an additional biometric identifier 418 such as user's fingerprint scanner, an iris recognition device, a vascular scanner, a palm print scanner, a DNA scanner, or any other suitable biometric scanning device. The user's fingerprint scanner may receive user biometric information. In the event that user biometric information is received by the fingerprint scanner, the biometric information obtained therefrom may be transmitted to CPU 402 via a USB Port (not shown).

It should be noted that additional biometric identifier 418 may be any suitable biometric identifier including but not limited to an iris scanner, a vascular scanner or any other suitable biometric information retrieval device. It should be further noted that additional biometric identifier 418 may communicate with CPU 402 via modem 404 or via any other suitable communications medium including but not limited to Bluetooth communication or any other suitable short-distance, wired or wireless, communications medium.

In the embodiments in which additional biometric identifier 418 is in electronic communication with CPU 402, CPU 418 may receive biometric information from additional biometric identifier 418 and buffer and/or filter the received data. The filtering may ensure that the received data is in compliance with one or more predetermined protocols. In the event that the data is determined to be out of compliance with the predetermined protocols (s), CPU 402 may substantially immediately delete the received data prior to transmitting the data.

In the event that the data is in compliance with the predetermined formats, CPU 418 may encrypt the data and transfer the encrypted data to Modem 404. Modem 404 may subsequently transfer the data through Router R to Electronic Communication Network N.

Figure 5:
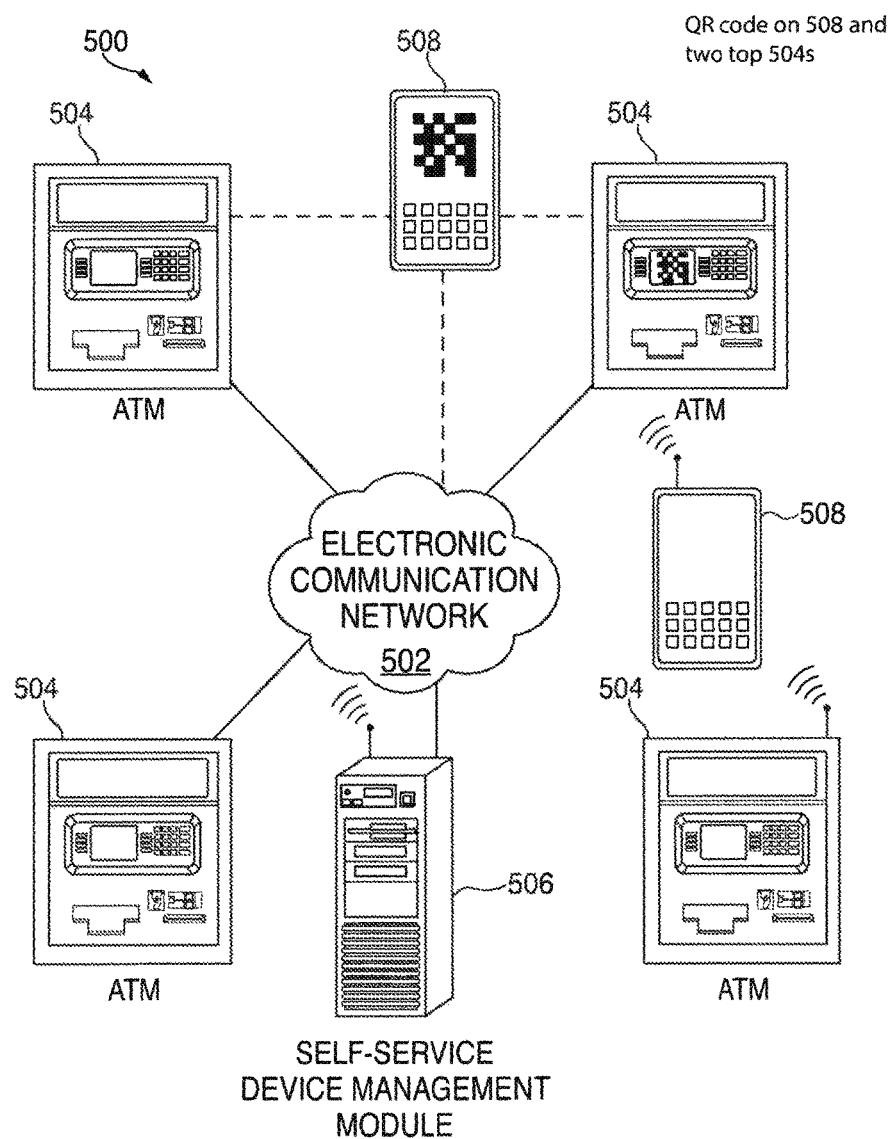
FIG. 5 shows a schematic diagram of a network for use according to the principles of the invention.

FIG. 5 shows illustrative transaction information network 500. Transaction information network 500 may include electronic communication network 502. Network 502 may be in part a LAN or WLAN, a WAN or WLAN or any other suitable network. Network 502 or portions thereof may be cabled, wired, optical fibered and/or wireless.

Self-service devices such as ATMs 504 may communicate via electronic communication network 502 with self-service device management module 506. A remote user may use self-service device management module 506 to monitor, control, reset, repair and/or intervene in one or more processes of ATMs 504. Transaction information network 500 may also include one or more mobile devices 508. It should be noted that devices 508 may communicate with one or more of ATMs 504 using near field communication or other short-distance, wired or wireless, communication.

In certain embodiments, devices 508 may preferably be configured to display a QR code for retrieval by one or more devices on ATM 504. In certain embodiments, ATMs 504 may be configured to display a QR code for retrieval by one or more devices 508. QR code-based interactions between ATMs 504 and such devices 508 are preferably described above with reference to FIGS. 1 and 2 and below with reference to FIGS. 6-11.

Figure 6:
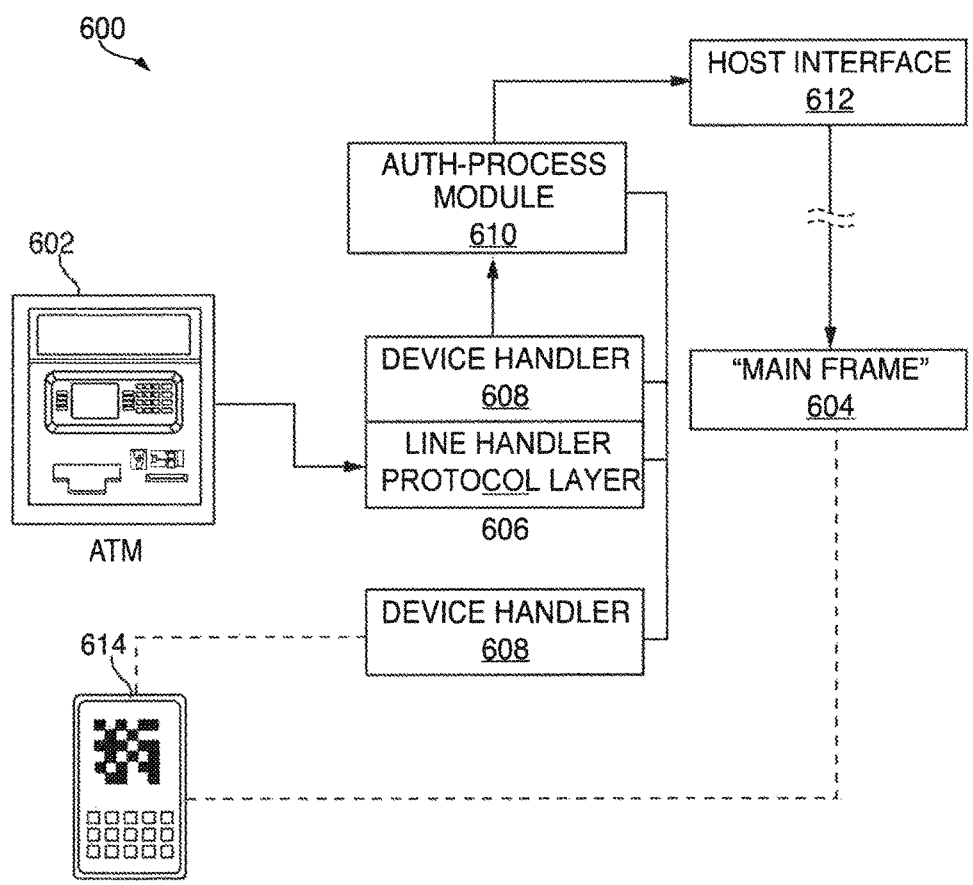
FIG. 6 shows a schematic diagram of another apparatus for use according to the principles of the invention.

FIG. 6 shows illustrative portions of communication system 600 for exchanging transaction information between ATM 602 and financial institution transactional platform 604. ATM 602 may be an ATM such as 100 or 200 (shown respectively in FIGS. 1 and 2). Transactional platform 604 may be any suitable device for settlement and clearing of transactions. For example, platform 604 may be a financial institution mainframe.

Command lines in transactional information from ATM 602 may be executed at line handler protocol layer 606. Device handler 608 may handle routing decisions based on transactional information requirements for authorization, settlement, clearance, transactional networks and issuing financial institutions. Authorization requests may then be processed by auth-process module 610. Auth-process module 610 may then provide transactional information to host interface 612 for communication with platform 604.

In certain embodiments, a device handler 608 may handle QR code communications, or other relevant communications, such as near-field communications ("NFC") with a mobile device such as mobile device 614. It should be noted that, in certain embodiments, mobile device 614 may be configured to communicate wirelessly communications with main frame 604. Such communications may be conducted via a communications media separate and apart from a communications media involving host interface 612. In certain embodiments, device handler 608 may receive information from the facial recognition camera and/or QR code information from the QR code receiver or other source of QR code information and handle routing decisions based on the received information. Such routing decisions may include routing of authorization information.

A supervisory module (not shown) may receive diagnostic data from line handler protocol layer 606, device handler 608, auth-process module 610, or any other suitable source.

Figure 7:
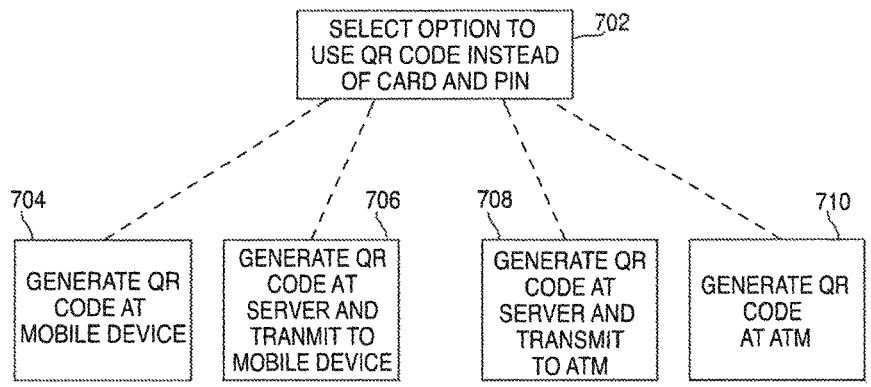
FIG. 7 shows an illustrative flow diagram according to certain embodiments.

FIG. 7 shows an illustrative flow diagram according to certain embodiments. The flow diagram in FIG. 7 preferably follows a step (not shown) in which an ATM user is provided with an option to use a QR code-based-communication to authenticate an ATM session. Step 702 shows receiving a selection by a user to initiate an ATM session using a QR code instead of authenticating using a conventional card and/or PIN.

Step 704 shows, in the event that user selects an option corresponding to initiating an ATM session using a QR code instead of authenticating using a conventional card and/or PIN, one possible embodiment may generate a QR code at the mobile device. This embodiment may be available upon user request or in response to a system setting.

Step 706 shows, in the event that user selects an option corresponding to initiating an ATM session using a QR code instead of authenticating using a conventional card and/or PIN, one possible embodiment may generate a QR code at the server and transmit the QR code to the mobile device. This embodiment may be available upon user request or in response to a system setting.

Step 708 shows, in the event that user selects an option corresponding to initiating an ATM session using a QR code instead of authenticating using a conventional card and/or PIN, one possible embodiment may generate a QR code at the server and transmit the QR code to, and for display by, the ATM. This embodiment may be available upon user request or in response to a system setting.

Step 710 shows, in the event that user selects an option corresponding to initiating an ATM session using a QR code instead of authenticating using a conventional card and/or PIN, one possible embodiment may generate a QR code at the ATM for display by the ATM. This embodiment may be available upon user request or in response to a system setting.

Figure 8:
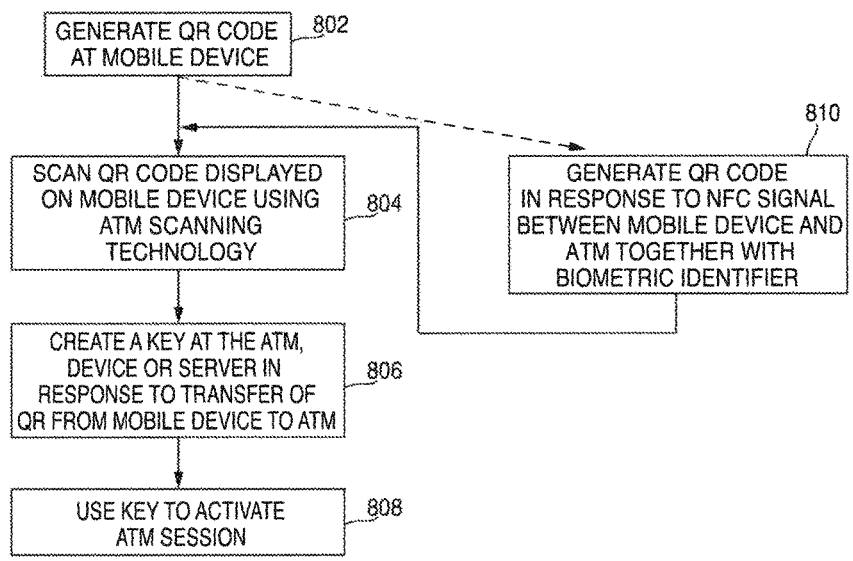
FIG. 8 shows another illustrative flow diagram according to certain embodiments.

FIG. 8 expands upon the embodiment shown in FIG. 7 at element 704. Step 802 shows generating a QR code at a mobile device. Step 804 shows scanning (at an ATM) the QR code displayed on the mobile device using ATM scanning technology. Step 806 shows creating a key at the ATM or server, in response to transfer of the QR code from the mobile device to the ATM. Step 808 using the key to activate (initiate or maintain) an ATM session.

Step 810 shows a possible alternative path in the method shown in FIG. 8. Specifically, step 810 shows generating a QR code in response to an NFC signal communicated between a mobile device and an ATM. Step 810 also shows that such a communication may, in certain circumstances require validation of one or more received biometric identifiers from the user. In any case, step 810 may cause display of a QR code on a mobile device, as shown at step 804.

Figure 9:
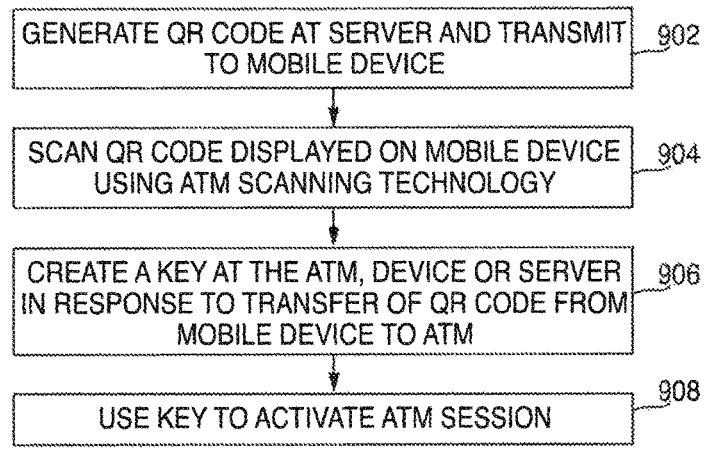
FIG. 9 shows yet another flow diagram according to certain embodiments.

FIG. 9 expands upon the embodiment shown in FIG. 7 at element 706. Step 902 shows generating a QR code at a server and transmitting the code to a mobile device. Step 904 shows using an ATM to scan the QR code displayed on the mobile device using ATM scanning technology. Step 906 shows creating a key at the ATM or server in response to transferring of the QR code from the mobile device to the ATM. Step 908 shows using the key to activate (initiate or maintain) the ATM session.

Figure 10:
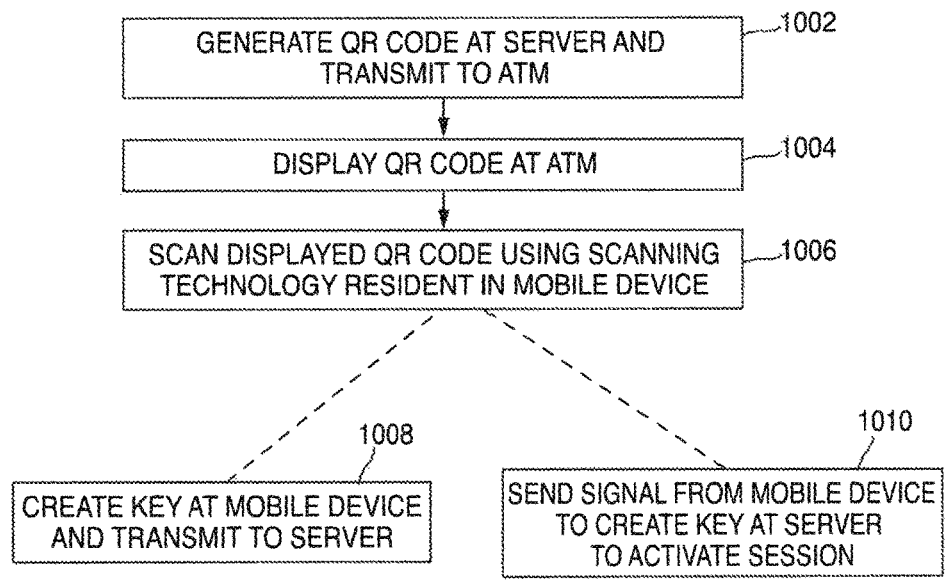
FIG. 10 shows still another flow diagram according to certain embodiments.

FIG. 10 expands upon the embodiment shown in FIG. 7 at element 708. Step 1002 shows generating a QR code at a server and transmitting the code to an ATM. Step 1004 shows displaying the QR code at the ATM. Step 1006 shows scanning the displayed QR code using scanning technology resident in the mobile device. Step 1008 shows a first possible option of creating a key at the mobile device and transmitting the created key to the server for use in initiating, activating or maintaining an ATM session. Step 1010 shows a second possible option of sending a signal from the mobile device to create a key at the server (or ATM) in order to activate (initiate or maintain) an ATM session. The signal may be sent via the various communications options described above in FIG. 6 with respect to mobile device 614's communication with main frame 604.

Figure 11:
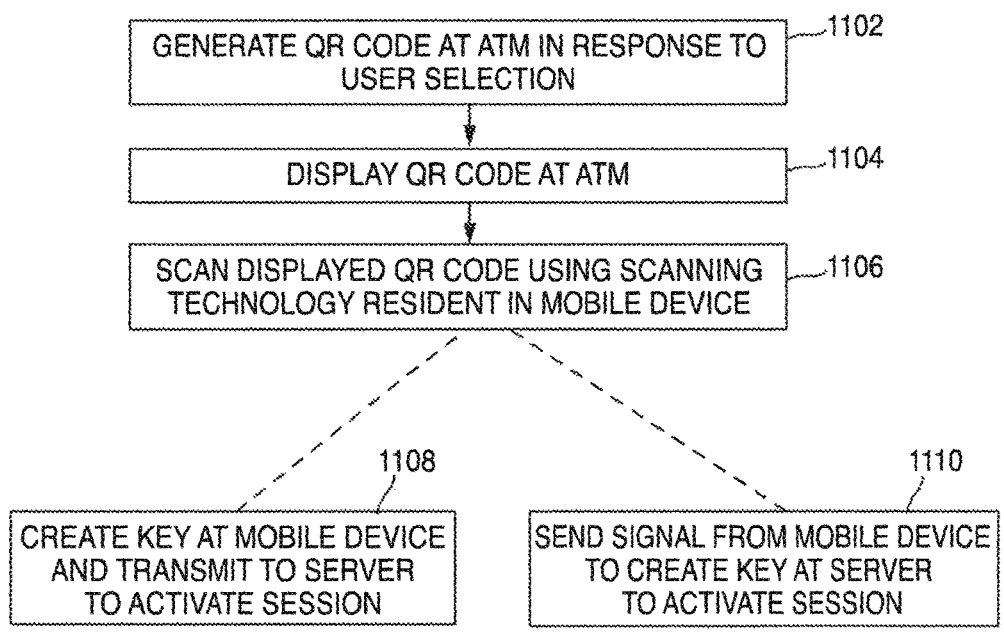
FIG. 11 shows an additional flow diagram according to certain embodiments.

FIG. 11 expands upon the embodiment shown in FIG. 7 at element 710. Step 1102 shows generating a QR code at an ATM in response to a user selection. Step 1104 shows displaying the QR code at an ATM. Step 1106 shows scanning a displayed QR code using scanning technology resident in the mobile device. Step 1108 shows a first optional embodiment for creating a key at the mobile device and transmitting the key to a server in order to activate (initiate and/or maintain) an ATM session. Step 1110 shows a second optional embodiment sending a signal from a mobile device directly or indirectly to a server to create a key at the server or ATM to activate the session or create a key at the ATM in response to instructions from the mobile device.

Thus, systems and methods for enabling single, in-line, automatic teller machine ("ATM") session maintenance using biometric characteristics have been provided. Persons skilled in the art will appreciate that the present invention can be practiced by other than the described embodiments, which are presented for purposes of illustration rather than of limitation. The present invention is limited only by the claims that follow.

What is claimed is:

1. An Automated Teller Machine ("ATM") for authenticating an identity of a user for the duration of an ATM session, the ATM comprising:
    a facial recognition camera being configured to capture at least a portion of user's facial information;
    an additional biometric identifier;
    one or more device handlers for receiving information related to the captured portion of the user's facial information from the facial recognition camera, for receiving additional biometric identification information from the additional biometric identifier and for determining one or more routing destinations for said information related to the captured portion of the user's facial information and for said additional biometric identification information; and
    a transmitter, said transmitter in electronic communication with the one or more device handlers, the transmitter configured to transmit the information received by the facial recognition camera and for said additional biometric identification in order to initially authorize the ATM session, said transmitting being routed to said one or more routing destinations;
    wherein said transmitter is further configured to maintain the ATM session by continuing to transmit, following the initial authorization and continuing for the duration of the ATM session, only authorization information received by the facial recognition camera to said one or more routing destinations;
    wherein the ATM further comprises a QR code receiving device for receiving QR code information from a user mobile device, said QR code information for routing by the one or more device handlers in order to authorize the ATM session, the QR code receiving device comprising a laser light source and the ATM further comprises a selectively releasable slot for providing a light communication pathway between a QR code receiving device and the user mobile device located at a distance from the ATM,
    wherein the QR code receiving device further includes a laser light acceptor, the laser light acceptor for receiving reflected laser light, and
    wherein the transmitter is further configured to maintain the ATM session by continuing to periodically transmit, following an initial authorization and continuing for the duration of the ATM session only authorization information received by the facial recognition camera to said one or more routing destinations.

2. The ATM of claim 1 wherein the ATM further comprises a rotatable mirror for directing light from the ATM to a mobile device, and receiving light from a mobile device.

3. The ATM of claim 2 wherein the ATM further comprises a rotatable mirror wherein, in a first operational state, the rotatable mirror is configured for directing light to a flatbed scanner portion of a document deposit device and for receiving light from the flatbed scanner portion of the document deposit device, and in a second operational state, is configured for directing light to a mobile device located at a distance from the ATM and for receiving light from the mobile device.

4. The ATM of claim 1 wherein the additional biometric identifier is selected from a list consisting of a fingerprint scanner, an iris recognition scanner, a palm print scanner, a vascular scanner and a DNA scanner.

5. One or more non-transitory computer-readable media storing computer-executable instructions which, when executed by a processor on a computer system, perform a method for authenticating a user's identity at an Automated Teller Machine ("ATM") over a period of time, the method comprising:
    capturing at least a portion of user's facial information using a facial recognition camera;
    receiving information using an additional biometric scanner;
    using one or more device handlers to receive information related to the captured portion of the user's facial information from the facial recognition camera and to receive information related to the additional biometric scanner and for determining one or more routing destinations for said information related to the captured portion of the user's facial information and for said information received from the additional biometric scanner; and
    transmitting using a transmitter, said transmitter in electronic communication with the one or more device handlers, the information received by the facial recognition camera and the information received from the additional biometric scanner for initially authorizing an ATM session, said transmitting being to said one or more routing destinations;

wherein said transmitting further maintains the ATM session by continuing, following an initial authorization, for the duration of the ATM session, only authorization information corresponding to the information received by the facial recognition camera to said one or more routing destinations;

wherein the transmitting further comprises opening a selectively releasable slot in order to provide a light communication pathway between a QR code receiving device located on the ATM and a mobile device located at a distance from the ATM;

wherein the QR code receiving device further includes a laser light acceptor, the laser light acceptor for receiving reflected laser light, and wherein the transmitter is further configured to maintain the ATM session by continuing to periodically transmit, following an initial authorization and continuing for the duration of the ATM session only authorization information received by the facial recognition camera to said one or more routing destinations.

6. An Automated Teller Machine ("ATM") for authenticating an identity of a user for the duration of an ATM session, the ATM comprising:

a facial recognition camera being configured to capture at least a portion of user's facial information;

an additional biometric identifier; and a transmitter, said transmitter for receiving information corresponding to the captured portion of the user's facial information the transmitter and information received by the facial recognition camera and the additional biometric identifier, said transmitting information for initially authorizing an ATM session, said transmitting being routed to one or more routing destinations;

wherein said transmitter is further configured to maintain the ATM session by continuing to transmit, following an initial authorization and continuing for the duration of the ATM session, only authorization information received by the facial recognition camera to said one or more routing destinations wherein the ATM further comprises a QR code receiving device for receiving QR code information, said QR code information for routing to a remote location to authorize the ATM session, the QR code receiving device comprising a laser light source and the ATM further comprises a selectively releasable slot for providing a light communication pathway between a QR code receiving device and a mobile device located at a distance from the ATM;

wherein the QR code receiving device further includes a laser light acceptor, the laser light acceptor for receiving reflected laser light, and wherein the transmitter is further configured to maintain the ATM session by continuing to transmit, following an initial authorization and continuing for the duration of the ATM session only authorization information received by the facial recognition camera to said one or more routing destinations.

7. The ATM of claim 6 wherein the receiver is coupled to a central ATM server, said central ATM server being remote from the ATM.

8. The ATM of claim 6 wherein the transmitter is further configured to maintain the ATM session by continuing to periodically transmit, following an initial authorization and continuing for the duration of the ATM session only authorization information corresponding to the information received by the facial recognition camera to said one or more routing destinations.

9. The ATM of claim 6 wherein the transmitter is further configured to maintain the ATM session by continuing to continuously transmit, following an initial authorization and continuing for the duration of the ATM session, only authorization information corresponding to the information received by the facial recognition camera to said one or more routing destinations.

* * * * *